United States Patent
Kauff et al.

(10) Patent No.: US 9,361,677 B2
(45) Date of Patent: Jun. 7, 2016

(54) SPATIO-TEMPORAL DISPARITY-MAP SMOOTHING BY JOINT MULTILATERAL FILTERING

(71) Applicant: Fraunhofer-Gesellschaft zur Foerderung der angewandten Forschung e.V., Munich (DE)

(72) Inventors: Peter Kauff, Berlin (DE); Christian Riechert, Berlin (DE); Frederik Zilly, Berlin (DE); Marcus Mueller, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/287,262

(22) Filed: May 27, 2014

(65) Prior Publication Data
US 2014/0270485 A1 Sep. 18, 2014

Related U.S. Application Data

(63) Continuation of application No. PCT/EP2012/073979, filed on Nov. 29, 2012.

(60) Provisional application No. 61/564,919, filed on Nov. 30, 2011.

(51) Int. Cl.
| | |
|---|---|
| *G06K 9/00* | (2006.01) |
| *G06T 5/10* | (2006.01) |
| *H04N 13/00* | (2006.01) |
| *G06T 5/00* | (2006.01) |
| *G06T 5/20* | (2006.01) |

(52) U.S. Cl.
CPC . *G06T 5/10* (2013.01); *G06T 5/002* (2013.01); *G06T 5/20* (2013.01); *H04N 13/0007* (2013.01); *H04N 13/0022* (2013.01); *G06T 2207/10028* (2013.01); *G06T 2207/20032* (2013.01); *G06T 2207/20182* (2013.01); *H04N 2013/0081* (2013.01)

(58) Field of Classification Search
USPC .......................................... 382/154, 107, 106
See application file for complete search history.

(56) References Cited

U.S. PATENT DOCUMENTS

| | | | |
|---|---|---|---|
| 2010/0271511 A1 | 10/2010 | Ma et al. | |
| 2011/0032341 A1* | 2/2011 | Ignatov et al. | 348/51 |
| 2012/0069009 A1* | 3/2012 | Shimoyama et al. | 345/419 |

FOREIGN PATENT DOCUMENTS

WO 2009/061305 A1 5/2009

OTHER PUBLICATIONS

Official Communication issued in International Patent Application No. PCT/EP2012/073979, mailed on Mar. 6, 2013.

*Primary Examiner* — Ruiping Li
(74) *Attorney, Agent, or Firm* — Keating & Bennett, LLP

(57) ABSTRACT

A filter structure for filtering a disparity map includes a first filter, a second filter, and a filter selector. The first filter is for filtering a contemplated section of the disparity map according to a first measure of central tendency. The second filter is for filtering the contemplated section of the disparity maps according to a second measure of central tendency. The filter selector is provided for selecting the first filter or the second filter for filtering the contemplated section of the disparity map, the selection being based on at least one local property of the contemplated section. A corresponding method for filtering a disparity map includes determining a local property of the contemplated section and selecting a filter. The contemplated section is then filtered using the first filter or the second filter depending on a result of the selection.

34 Claims, 6 Drawing Sheets magnification of critical region and corresponding initial disparity map weights using new distance function and resulting disparity map after filtering initial (color) image weights of conventional bilateral filter and resulting disparity map after filtering

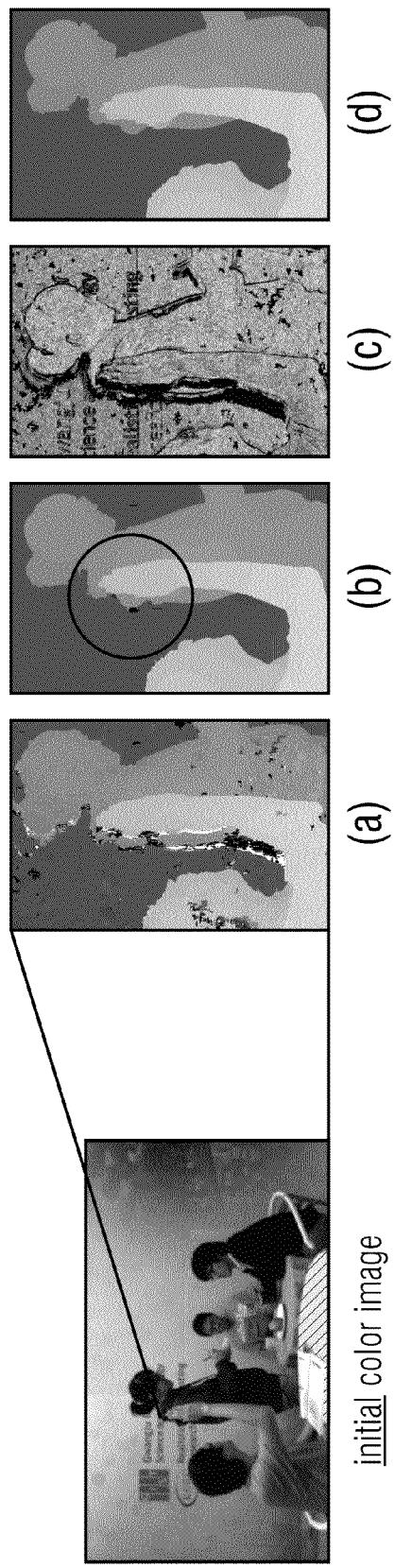

SPATIO-TEMPORAL DISPARITY-MAP SMOOTHING BY JOINT MULTILATERAL FILTERING

CROSS-REFERENCE TO RELATED APPLICATIONS

This application is a continuation of copending International Application No. PCT/EP2012/073979, filed Nov. 29, 2012, which is incorporated herein by reference in its entirety, and additionally claims priority from U.S. Application No. 61/564,919, filed Nov. 30, 2011, which is also incorporated herein by reference in its entirety.

BACKGROUND OF THE INVENTION

Estimating dense pixel-by-pixel disparity maps from a pair of stereo-images is an active research topic since decades. A good review of current research in this field can be found in [1], [2] and [3] (see list of references below). One way to distinguish between the different approaches is to divide them into two categories, global and local methods. Local methods usually compare small patches in the left and right image to find the best match. Global approaches aim to find a globally optimal solution for the whole frame.
Almost all disparity estimation algorithms use some kind of post-processing to
    align disparity (depth) discontinuities to object borders
    remove matching noise and mismatches
    fill image areas with unmatched pixels
    enforce temporal consistency
One common approach is to use joint-bilateral filters. The idea is to calculate the filter-coefficients of a bilateral filter [4] scene-adaptively by using the color information of the original images and to apply the adaptive filter to the disparity maps.

While local methods usually compare small patches in the left and right image to find the best match, global approaches aim to find a globally optimal solution for the whole frame. Local correlation algorithms often produce noisy disparity maps with inaccurate aligned object borders, but offer the possibility to provide temporal consistency of the disparity maps. In contrast, global methods enable spatial smoothness and well aligned depth discontinuities at object borders, but they usually do not consider temporal consistency. As a result, generating virtual intermediate views from these disparity maps by applying Depth-Image Based Rendering (DIBR) to the original stereo-images often creates visually annoying disturbances and artifacts.

SUMMARY

According to an embodiment, a filter structure for filtering a disparity map may have: a first filter for filtering a contemplated section of the disparity map according to a first measure of central tendency; a second filter for filtering the contemplated section of the disparity map according to a second measure of central tendency; and a filter selector for selecting the first filter or the second filter for filtering the contemplated section of the disparity map, the selection being based on at least one local property of the contemplated section.

According to another embodiment, a method for filtering a disparity map may have the steps of: determining a local property of a contemplated section of the disparity map for the purpose of filtering; selecting a first filter or a second filter for filtering the contemplated section, the selection being based on the at least one determined local property of the contemplated section; filtering the contemplated section of the disparity map using the first filter or the second filter depending on a result of selecting the first filter or the second filter.

Another embodiment may have a computer readable digital storage medium having stored thereon a computer program having a program code for performing, when running on a computer, the inventive method.

Embodiments of the present invention provide a filter structure for filtering a disparity map. The filter structure comprises a first filter and a second filter. The first filter is provided for filtering a contemplated section of the disparity map according to a first measure of central tendency. The second filter is for filtering the contemplated section of the disparity maps according to a second measure of central tendency. The filter structure further comprises a filter selector for selecting the first filter or the second filter for filtering the contemplated section of the disparity map. The selection done by the filter selector is based on at least one local property of the contemplated section.

Further embodiments provide a method for filtering a disparity map. The method comprises determining a local property of a contemplated section of the disparity map for the purpose of filtering. A first filter or a second filter is then selected for filtering the contemplated section, the selection being based on the at least one determined local property of the contemplated section. The method further comprises filtering the contemplated section of the disparity map using the first filter or the second filter depending on a result of the selection of the first filter or the second filter.

Further embodiments provide a computer readable digital storage medium having stored thereon a computer program having a program code for performing, when running on a computer, the method for filtering a disparity map mentioned above.

The present invention reduces visually annoying disturbances and artifacts, that are created by applying Depth-Image Based Rendering (DIBR) to the original stereo images, by introducing a new joint multi-lateral filter to improve previously estimated disparity maps before using them for DIBR. The improvement refers to all three properties that are important for pleasant rendering results: spatial smoothness, temporal consistency and exact alignment of depth discontinuities to object borders. It can be applied to any kind of disparity map independently of the method by which they have been created.

BRIEF DESCRIPTION OF THE DRAWINGS

Embodiments of the present invention will be detailed subsequently referring to the appended drawings, in which:
FIG. 6 illustrates an improvement achieved by the introduction of the new confidence kernel.

DETAILED DESCRIPTION OF THE INVENTION

As mentioned above, a common approach in post-processing an estimated disparity map is to use joint-bilateral filters.

Filter-coefficients of such a bilateral filter [4] are calculated scene-adaptively by using the color information of the original images and to apply the adaptive filter to the disparity maps. However, in practice, there are several crucial drawbacks with this approach:

Smoothing Object Borders
In spite of the edge preserving property of bilateral filters by using scene-adaptively weighted filter coefficients, discontinuities in the disparity map at object borders might be somewhat smoothed due to averaging characteristics of conventional bilateral filter kernels.

Introduction of False Disparity Values
When using large filter windows it can happen that pixels inside the filter window, which have the same color as the center pixel but originate from another object at different depth, can corrupt the filter response (i.e., the output pixel is aligned to a wrong disparity value).

Sensitivity to Mismatches
Usually bilateral filters do not take into account confidence measures from the disparity estimation process. As a consequence mismatches might remain as wrong disparity values in the filtered disparity map, might affect the filter response in surrounding pixels, or might even be propagated in the filtered disparity map.

Temporal Consistency
Regular cross-bilateral filters and global optimization approaches only work on a per frame basis and thus do not consider temporal consistency. In case of using local correlation methods that are able to provide temporal consistency on principle (e.g. by local temporal recursion), the subsequent application of regular cross-bilateral filters can degrade or even remove the temporal consistency again.

To overcome these drawbacks the invention uses the following new multi-lateral filter structure instead of conventional bilateral filters.

Motion Compensation and Reliably Motion Compensated (RMC) Pixel

To keep temporal consistency in case of local disparity estimation (or to introduce it into global methods), the multi-lateral filter structure is based on spatio-temporal processing using motion compensation. In a straight-forward approach, motion compensation is applied to a symmetric cluster of $N=2r_t+1$ frames in a temporal interval $[t_0-r_t; t_0+r_t]$ where $t_0$ denotes the current frame. However, if necessitated from the implementation point of view, it can also be applied to an asymmetric cluster in the temporal interval $[t_0-r_t; t_0]$ using current and previous frames only.

Figure 1:
FIG. 1 shows an example of some motion compensated images (MCI's) in a symmetric cluster around reference frame $t_0$.

According to one possible implementation, a combination of KLT-Tracking (Kanade-Lucas-Tomasi (feature) Tracking) and simple frame differencing is used to create motion compensated images (MCI). However, any other method of motion compensation can be taken as well. After motion compensation, corresponding pixels are at same position p in all MCI's as they are in current reference frame $t_0$. As an example, FIG. 1 shows this condition for some images in a symmetric cluster with $r_t=10$, $N=21$ and an interval $[t_0-10; t_0+10]$. In particular, FIG. 1 shows an example of some MCI's in a symmetric cluster around reference frame $t_0$. Non-RMC pixels are marked with white color in FIG. 1.

If color intensity does not change significantly at one pixel position over time after motion compensation, this pixel is labeled as reliably motion compensated (RMC) pixel. All other pixels (i.e. non RMC pixel) are marked with white color in the example from FIG. 1. Note that, for labeling RMC pixels, further reliability measures can be used in addition or instead (e.g. implicit confidence measure of the used motion compensation method like the one available from KLT tracking or consistency checks from between forward and backward motion estimation).

Adaptive Switching Between Weighted Median and Average Filters

Since conventional cross-bilateral filters compute a scene-adaptively weighted average of disparity values in the filter window, some undesired smoothing of the depth maps at objects borders might occur. This smoothing of depth edges can be avoided by switching between weighted median and weighted average filter due to their following properties [6]. On one hand, weighted median filters preserve depth discontinuities better than weighted average filters at object borders. On the other hand, in regions far from object borders, e.g. in areas of homogeneous color, weighted average filter clearly outperform weighted median filters. Thus, switching between the two filter types has to be designed scene-adaptively in dependence on the local structure of color images and depth maps.

To achieve such a scene-adaptive performance, the underlying invention uses the following multi-lateral filter structure:

$$D_o(p_0, t_0) = \begin{cases} \text{weighted\_median}_{p,t \in n}\{w(p, t), D_{mc}(p, t)\} & \text{if } p_0 \in \text{Mask}(p, t_0) \\ \text{weighted\_average}_{p,t \in n}\{w(p, t), D_{mc}(p, t)\} & \text{if } p_0 \notin \text{Mask}(p, t_0) \end{cases} \quad (1)$$

with $$w(p, t) = \text{weight}_{Dist}(p, p_0, t) \cdot \text{weight}_{conf}(p, t) \cdot \text{weight}_{temp}(p, t)$$

In general, the filter structure is based on a 3-dimensional spatio-temporal window n around a center pixel position $p_0$ and the reference frame $t_0$. Note that p and t denote pixels and frames within window n. Furthermore, the filter structure is applied to motion compensated disparity values $D_{mc}(p,t)$. For this purpose, same motion compensation as for MCI generation in Section "Motion Compensation and Reliably Motion Compensated (RMC) Pixel" is applied to the disparity maps and the temporal expansion of window n coincides with the interval $[t_0-r_t; t_0+r_t]$ or $[t_0-r_t; t_0]$ of motion compensation. At the output filtered disparity values $D_O(p,t)$ are calculated for central window position $p_0$ at reference frame $t_0$.

As usual, the weighted averaging filter is an operation where the motion compensated disparity values $D_{mc}(p,t)$ are multiplied by adaptive weighting factors $w(p, t)$ before calculating the average score. In contrast, for the weighted median the frequencies of the motion compensated disparity values $D_{mc}(p,t)$ are multiplied by weighting factors $w(p,t)$ before calculating the median score. In both cases, the weighting factors have to be normalized such that their sum over the active window space equals to a pre-defined constant value.

As written in eq. (1), the related weighting factors depend on the three multiplica-tive kernels weight$_{dist}$(p,t), weight$_{conf}$(p,t) and weight$_{temp}$(p,t). The meaning of these kernels will be explained in the next sections.

The scene-adaptive switching between the filter types is driven by a binary mask Mask(p, $t_0$) that is derived from color and disparity information in the reference frame $t_0$ only. The following rules are used for computing Mask(p,$t_0$):

The weighted median is used if
- the central pixel $p_0$ is labeled as RMC pixel (see section "Motion Compensation and Reliably Motion Compensated Pixel")
- or a depth discontinuity is detected inside the filter window at reference frame $t_0$ (e.g., maximal gradient of initial disparity values $D_{mc}(p,t_0)$ exceeds a predefined threshold Thres_DepthDisc)
- or color values of original images differ significantly within the filter window at reference frame $t_0$ (e.g., variance of color samples within the window exceeds a predefined threshold Thres_Var)

The weighted average is used in all other cases (i.e., homogeneous color regions in reference frame $t_0$ with significantly large distance to object borders)

Figure 2:
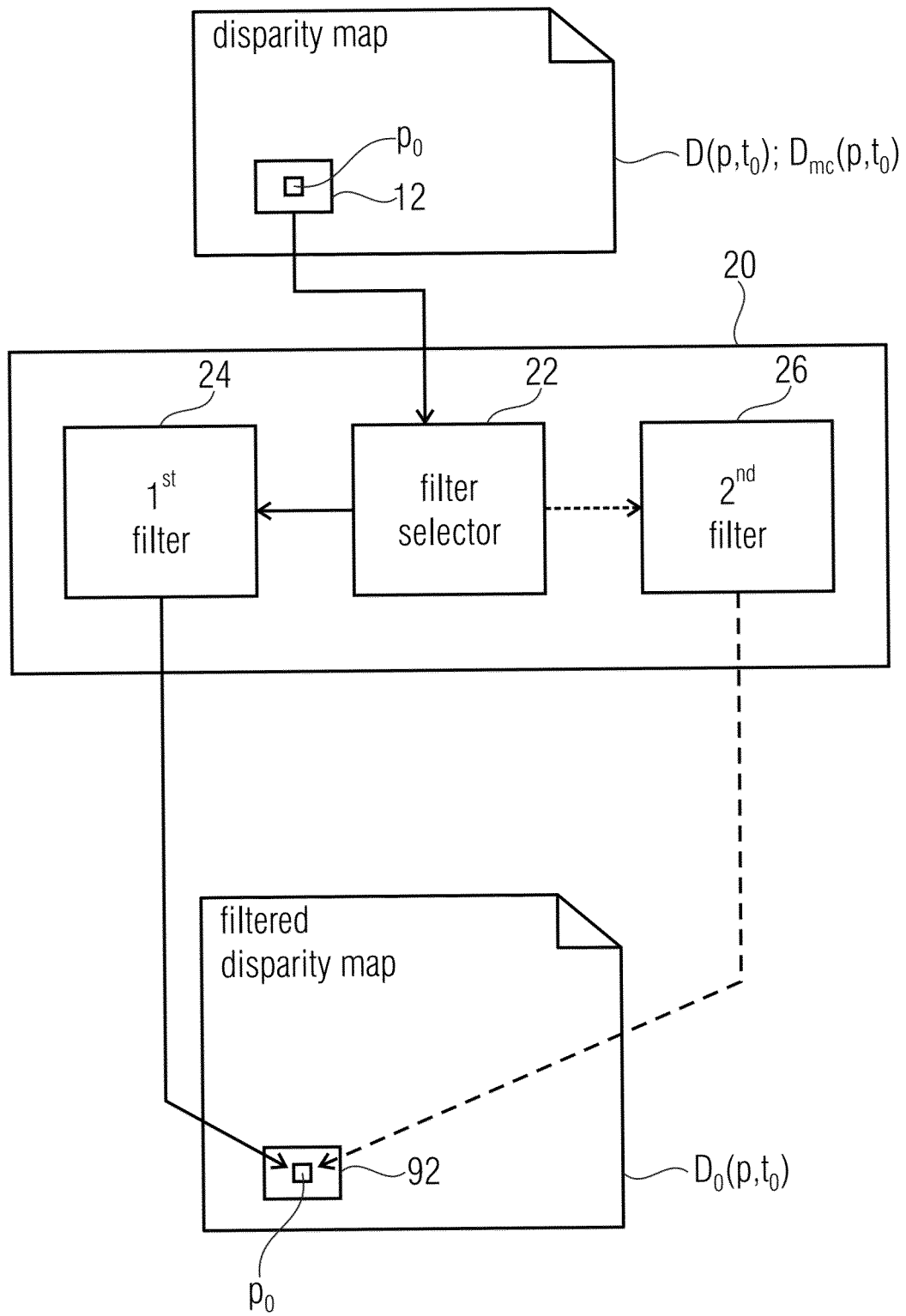
FIG. 2 shows a schematic block diagram of a filter structure according to embodiments.

FIG. 2 shows a schematic block diagram of a filter structure 20 according to embodiments of the teachings disclosed herein. The filter structure 20 for filtering a disparity map $D(p, t_0)$ of a temporal sequence of disparity maps $D(p, t)$ comprises a first filter 24 for filtering a contemplated section 12 (for example: pixel $p_0$, or a group of pixels) of the disparity map $D(p, t_0)$ according to a first measure of central tendency; a second filter 26 for filtering the contemplated section 12 (e.g., $p_0$) of the disparity maps $D(p, t_0)$ according to a second measure of central tendency; and a filter selector 22 for selecting the first filter 24 or the second filter 26 for filtering the contemplated section 12 of the disparity map $D(p, t_0)$, the selection being based on at least one local property of the contemplated section 12. Note that the filtering may only affect the center pixel $p_0$, or may also affect other pixels within a filter window (n) in which the pixel $p_0$ is the center pixel. The filter structure 20 is configured to output a filtered disparity map $D_O(p, t_0)$ (i.e., the filtered disparity values) comprising a filtered contemplated section 92.

For example, the first filter 24 may be a median filter and filter the contemplated section 12 according to a median filtering scheme. The second filter 26 may be an average filter and configured to filter the contemplated section 12 according to an average filtering scheme.

The at least one local property may control a binary mask Mask(p, $t_0$) for the disparity map indicating to the filter selector 22 whether the first filter 24 or the second filter 26 is to be used for filtering the contemplated section.

The at least one local property may comprise at least one of
- the contemplated section 12 being labeled as reliably motion compensated (RMC) by a motion compensation unit upstream of the filter structure;
- a detection of a depth discontinuity within a filter window (n) that is used for filtering the contemplated section 12;
- a color inhomogeneity or gray value inhomogeneity within a filter window (n) of a color image or a gray value image corresponding to the filter window (n) of the disparity map $D(p, t_0)$ that is used for filtering the contemplated section 12; and
- a variance of color samples exceeding a threshold, the variance being determined within a filter window (n) of a color image or a gray value image corresponding to the filter window (n) of the disparity map $D(p, t_0)$.

The first filter 24 may be a weighted first filter and the second filter 26 may be a weighted second filter.

A weighting performed by the weighted first filter 24 or the weighted second filter 26 may be based on at least one of
- a distance measure between the contemplated section 12 (e.g. $p_0$) and a further section of the disparity map to be used for the weighted filtering;
- a confidence value for the contemplated section 12 (e.g. $p_0$) of the disparity map $D(p, t_0)$; and
- a temporal consistency between the contemplated section 12 (e.g. $p_0$) of the disparity map $D(p, t_0)$ and a corresponding section or matching section in at least one of a preceding disparity map, several preceding disparity maps, a subsequent disparity map, and several subsequent disparity maps.

The distance measure may be determined on the basis of a sum of color differences along a path from the contemplated section 12 (e.g. $p_0$) to the further section.

A filter window (n) may be associated to the contemplated section 12 (e.g. $p_0$) of the disparity map $D(p, t_0)$, the filter window (n) being a 3-dimensional spatio-temporal window and defining a spatial extension and a temporal extension of filtering actions performed by the first filter 24 and the second filter 26.

The filter structure 20 may further comprise a section iterator for iterating the contemplated section 12 (e.g. $p_0$) of the disparity map $D(p, t_0)$ over the disparity map or a part thereof.

The contemplated section 12 (e.g. $p_0$) may correspond to a pixel of the disparity map $D(p, t_0)$.

The filter selector 22 may comprise an adaptive switching unit for switching between the first filter 24 and the second filter 26.

Figure 3:
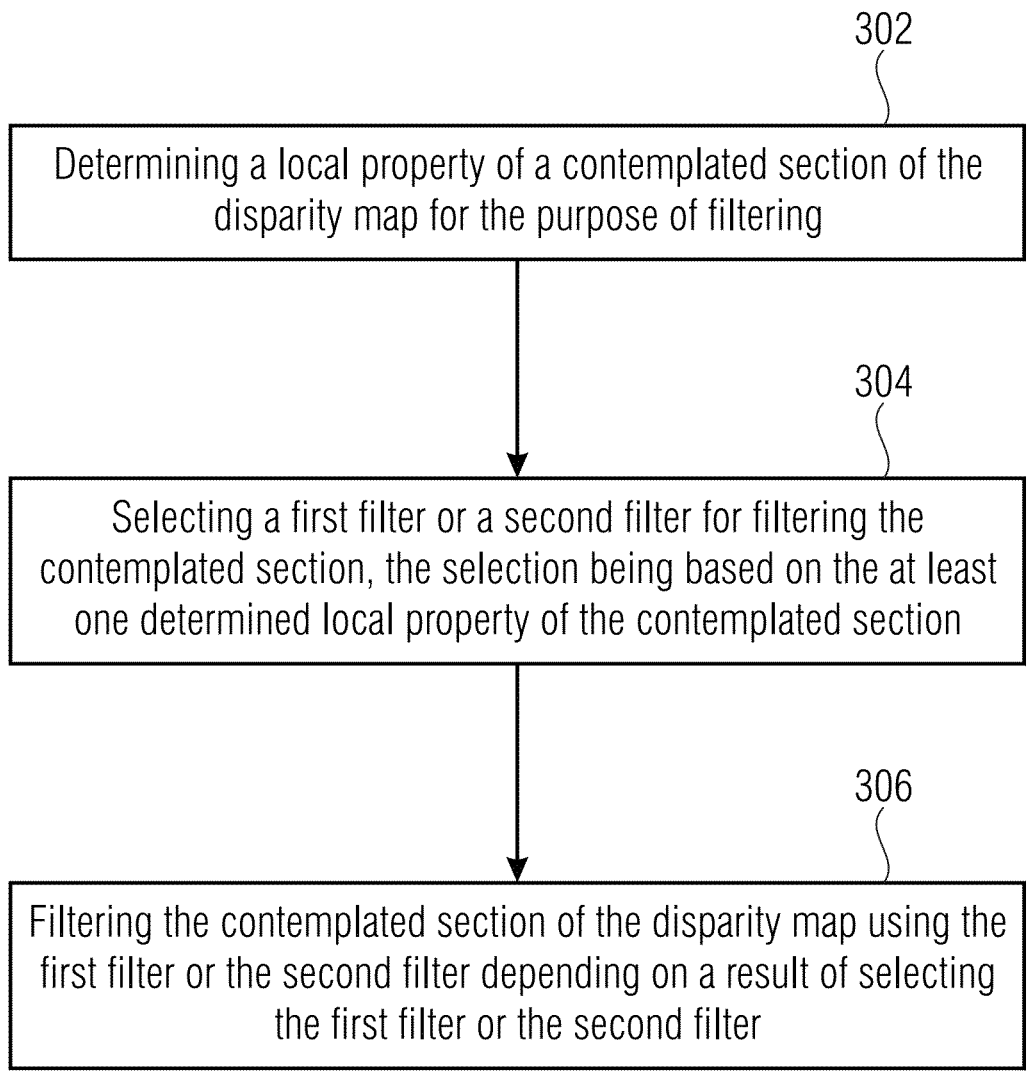
FIG. 3 shows a schematic flow diagram of a method for filtering a disparity map according to embodiments.

FIG. 3 shows a schematic flow diagram of a method for filtering a disparity map $D(p, t_0)$ of a temporal sequence of disparity maps. The method comprises a step 302 of determining a local property of a contemplated section $p_0$ of the disparity map for the purpose of filtering. A first filter or a second filter is then selected at a step 304. The first and second filters are provided for filtering the contemplated section (e.g. pixel $p_0$ or a region surrounding pixel $p_0$). The selection is based on the at least one determined local property of the contemplated section. The method further comprises a step 306 of filtering the contemplated section $p_0$ of the disparity map $D(p, t_0)$ using the first filter or the second filter depending on a result of the selection the first filter or the second filter.

Depending on whether the step 304 of selecting has selected the first filter or the second filter, the contemplated section is filtered using a first measure of central tendency or a second measure of central tendency. For example, the first measure of central tendency may be a median and the second measure of central tendency may be an average.

The method may further comprise: determining a binary mask for the disparity map on the basis of the local property, the binary mask indicating to the filter selector whether the first filter or the second filter is to be used for filtering the contemplated section (e.g. $p_0$).

Filtering the contemplated section (e.g. $p_0$) may comprise: weighting disparity values comprised in the contemplated section of the disparity map, for example using weighting factors w(p,t).

The distance measure may be determined on the basis of a sum of color differences along a path from the contemplated section (e.g. $p_0$) to a further section.

The method may further comprise: iterating the contemplated section (e.g. $p_0$) of the disparity map $D(p, t_0)$ over the disparity map or a part thereof.

The selection the first filter or the second filter may comprise a scene-adaptive switching between the first filter and the second filter in dependence on a local structure of color images and depth maps corresponding to the disparity map $D(p, t_0)$.

Figure 4:
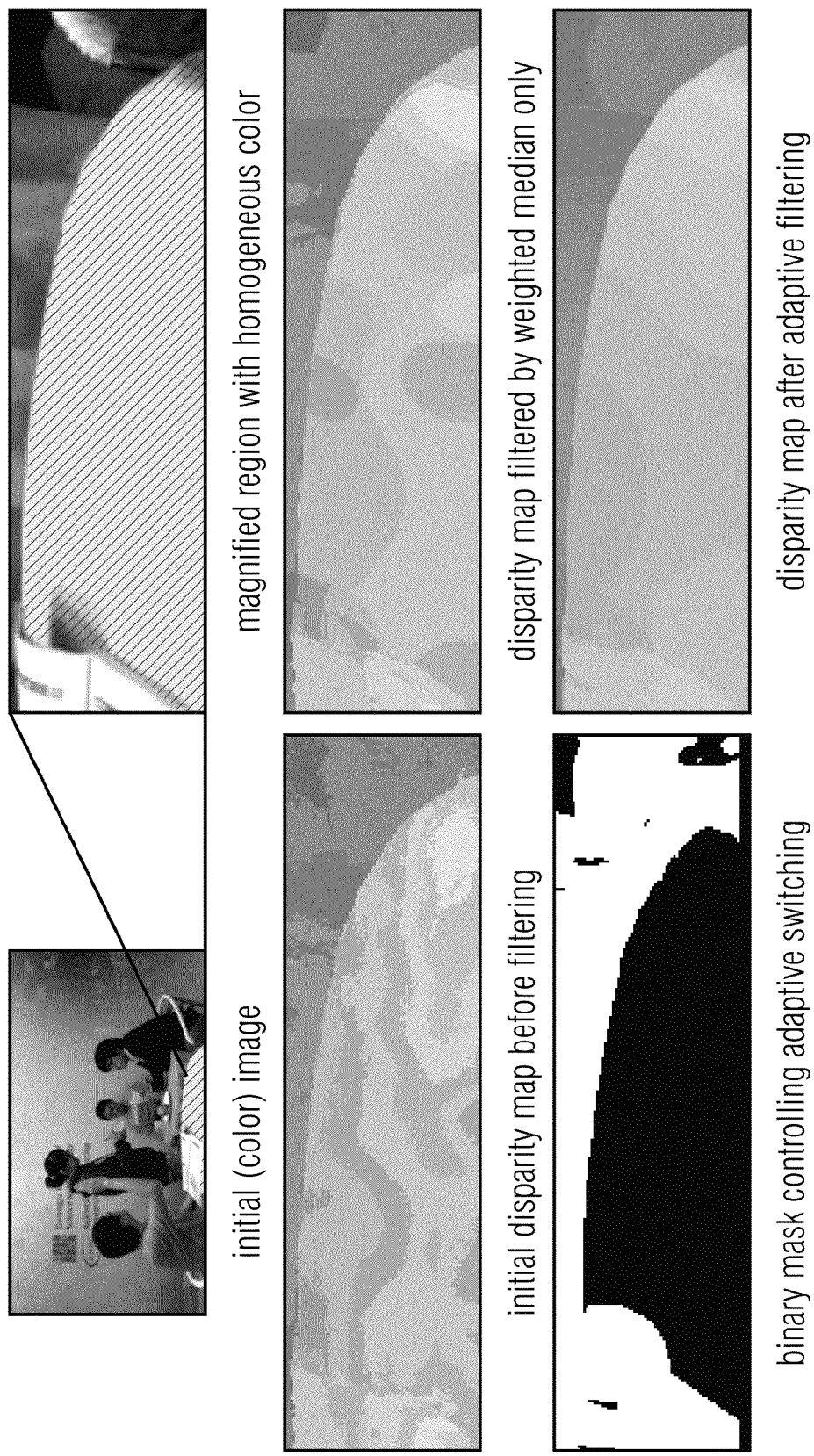
FIG. 4 schematically illustrates an effect of scene-adaptive switching between weighted median and average filters.

FIG. 4 shows the effect of the scene-adaptive switching between weighted median and average filters. The top depicts an original image (left) and a magnified region with a large region of homogenous color (right). The large region of homogeneous color (yellow in the original color image) has been hatched in FIG. 4. The left picture in the middle shows the initial disparity map in this region (boundaries of regions having different disparity values being enhanced for clearer representation). Note that it contains some matching noise although the object in the region under inspection refers to a plane in the 3D space. The right picture in the middle shows the results after applying the weighted median filter only to the initial disparity values. The depth discontinuity at the object border could be preserved due to the median properties, but the smoothing in the homogeneous color regions is still imperfect. In contrast, the related picture at bottom (right) shows the result for an adaptive switching between the two filter types. Note that the depth discontinuity are still preserved due to the usage of the weighted median in this area, whereas the smoothing in the homogeneous region is better now because the filter structure switches to weighted average in this region. In addition, the left picture at the bottom shows the binary mask Mask(p,$t_0$) that has been derived from the original color image (top right) and the initial disparity map (middle right) to control the adaptive switching: Black indicates "weighted average filter" and white indicates "weighted median filter".

New Distance Function

In addition the invention may also use a new kind of distance kernel. The usual one of conventional bilateral filters is replaced by a kernel weight$_{dist}$(p,$p_0$,t) that represents the costs of the cheapest path between all pixels in the filter window and its center pixel $p_0$ at all frames t in the 3-dimensional window.

A path $P_i$(p,$p_0$,t) is a sequence of adjacent pixels that can be found for each frame t between an arbitrary pixel p in the filter window and its center pixel $p_0$ by using an 8-connectivity operator. The index indicates that there is usually more than one possible path between these two points. The cost C($P_i$) of a particular path $P_i$ is the sum of all absolute color differences along the path. The distance of minimal cost can then be defined as follows:

$$\text{Dist}(p,p_0,t) = \min_{P \in \{P_i(p,p_0,t)\}} \{C(P_i(p,p_0,t))\} \quad (2)$$

with $\{P_i(p, p_0,t)\}$ indicating the set of all possible paths between p and $p_0$ at frame t.

Hence, Dist(p,$p_0$,t) describes the "cheapest" path from $p_0$ to p at frame t.

Based on this new distance function, the weights of the distance kernel are then computed as usual:

$$weight_{Dist}(p, p_0, t) = \exp\left(-\frac{Dist(p, p_0, t)}{\sigma_D}\right) \quad (3)$$

Assuming that two disconnected objects of almost same color but with different depth have other regions of different colors in between, the above introduction of path costs into the distance kernel inhibits the influence of pixels in the filter window which do not belong to the same object and depth as the center pixel but have almost the same color. A similar distance function has already been used in [5] for controlling the size of adaptive measurement windows in stereo matching.

Figure 5:
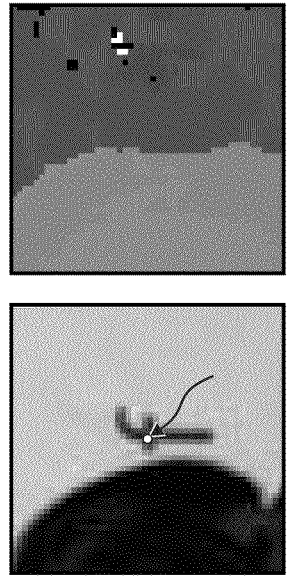
FIG. 5 shows a performance comparison between distance/color kernel of conventional cross-bilateral filters and the invented filter method using the new distance function.
Figure 5:
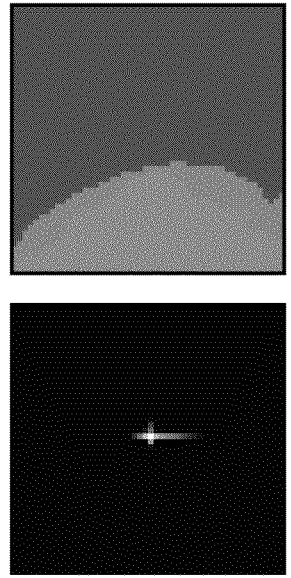
Figure 5:
Figure 5:
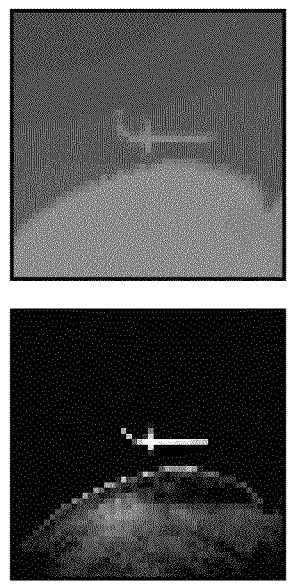

FIG. 5 shows a performance comparison between distance/color kernel of conventional cross-bilateral filters and the invented filter method using the new distance function. In other words, FIG. 5 gives an example for the improvements that are achieved with the new distance function. The left picture at top shows a black-and-white version of the original color image and the right picture is a magnification of a critical region as well as the corresponding disparity map. The magnified image region shows a part of the standing woman's head in front of the background. Note that the background contains an f-letter that has the same color as the woman's hair.

The left pictures at the bottom show the weights of a conventional bilateral filter (for a window with the center pixel $p_0$ in the f-letter at the background, see white dot at the inter-section of the vertical and horizontal bars of the f-letter, as indicated by the arrow in the magnified image region at top) as well as the resulting filtered disparity map. It can be seen that the filter improves the alignment of the disparity map to the object border, but that it also aligns a wrong disparity (depth) to the f-letter in the background. The reason is that woman's hair and f-letter have almost the same color and that the distance between head and f-letter is not high enough to clearly separate these two objects. Hence, the pixels in the head are labeled with high weights in this case and the disparity value of the head's depth is wrongly aligned to the region of the f-letter.

As shown in the right pictures at the bottom this misalignment can be avoided by using the new distance function. The costs of any path from the center pixel $p_0$ to all pixels p in the head region are relatively high because of the blue background color between the woman's hair and the f-letter. Thus, the distance between head and f-letter is artificially increased and the high weights in the head region are removed. As a consequence, the correct disparity value referring to the background depth is now aligned to the f-letter.

Confidence Kernel

Apart from the new distance function, the underlying invention also introduces a new confidence kernel weight$_{conf}$ (p,t). It takes into account that confidence and reliability measures might be available from the matching process for each disparity value. Hence, they can be used to assign a high weight to reliable matches and, vice versa, low weights to matches with low confidence and poor reliability. In principle, any confidence and reliability measure can be taken in this context.

As an example, the weight of the confidence kernel can use two terms, one referring to the reliability of the disparity maps D and another one evaluating color matches in the original images I:

$$weight_{conf}(p,t) = \text{conf}_D(D_{mc}(p,t)) \cdot \text{conf}_I(I_{mc}(p,t)) \quad (4)$$

A very usual confidence measure evaluating the reliability of estimated disparity maps is based on the left-right consistency. Assuming that both, left-to-right and right-to-left disparity maps are available, a consistency check can be carried out by calculating the following difference diff$_D$(p,t):

$$\text{diff}_D(p,t) = |D_{mc,lr}(p,t) + D_{mc,rl}(p+D_{mc,lr}(p,t),t)| \quad (5)$$

Here, $D_{mc,lr}$(p,t) and $D_{mc,rl}$(p,t) denote initial disparity maps which have been estimated from left to right stereo images and, vice versa, from right to left images at frame t, and have been motion compensated afterwards as described in Section "Motion Compensation and Reliably Motion Compensated (RMC) Pixel". Note that p and D are 2-dimensional vectors in eq. (5) containing both, a horizontal and a vertical image component, and that, assuming a rectified stereo state, the vertical component of the disparity maps is usually equal to zero. The disparity related term of the confidence kernel can then be calculated by the reciprocal of the difference from the left-right consistency:

$$conf_D(D_{mc}(p,t)) = \begin{cases} 0 & \text{if } diff_D(p,t) > ThresLeftRight \\ 1 & \text{if } diff_D(p,t) = 0 \\ 1/diff_D(p,t) & \text{elsewhere} \end{cases}$$

Similar to eq. (5), one can define a difference $diff_I(p,t)$ between color matches:

$$diff_I(p,t) = |I_{mc,l}(p,t) - I_{mc,r}(p+D_{mc,lr}(p,t),t)| \qquad (6)$$

In this context $I_{mc,l}(p,t)$ and $I_{mc,r}(p,t)$ mean the motion-compensated color images as described in Section "Motion Compensation and Reliably Motion Compensated (RMC) Pixel". A confidence kernel related to color matches can then be defined accordingly:

$$conf_I(I_{mc}(p,t)) = \begin{cases} 0 & \text{if } diff_I(p,t) > ThresColorMatch \\ 1 & \text{if } diff_I(p,t) = 0 \\ 1/diff_I(p,t) & \text{elsewhere} \end{cases}$$

The results in FIG. 6 demonstrate the improvements that can be achieved by using the new confidence kernel. In particular, FIG. 6 shows from left to right: a black-and-white version of the original color image; (a) a magnified disparity map in a critical region; (b) a filtered disparity map obtained by using conventional cross-bilateral filter; (c) a confidence kernel in this region; and (d) the improvement achieved by using additional confidence kernel.

The left picture in FIG. 6 again shows a black-and-white version of the initial color image followed by a magnified disparity map estimated in a critical region (picture (a)). Note that there are a lot of crucial mismatches between the arm of the man in the foreground and the back of the woman behind him. The next picture (b) shows the disparity map after conventional cross-bilateral filtering. The disparity map has clearly been improved but some mismatches remain (see black circle). The third picture (c) shows the confidence map in this region. Non-reliable matches are marked with black color. As these areas also cover the remaining mismatches after conventional filtering, they are removed with the new method using an additional confidence kernel. The improved result is shown in the right picture (d).

Temporal Consistency

A kernel weight$_{temp}(p,t)$ enforcing temporal consistency may also be introduced in the new filter structure from Section "Motion Compensation and Reliably Motion Compensated (RMC) Pixel". This temporal kernel controls the influence of (temporally) adjacent frames to the final filter results and, with it, smoothes the results in temporal direction. However, to prevent smoothing over moving object borders, temporal filtering is applied to the motion compensated disparity maps and is restricted to RMC pixels only (see Section "Motion Compensation and Reliably Motion Compensated (RMC) Pixel"):

$$weight_{temp}(p,t) = \begin{cases} \exp\left(-\left(\frac{t}{\sigma_t}\right)^2\right) & \text{if } p \text{ is } RMC \text{ pixel} \\ 1 & \text{if } p \text{ is no } RMC \text{ pixel and } t = t_0 \\ 0 & \text{if } p \text{ is no } RMC \text{ pixel and } t \neq t_0 \end{cases}$$

Note that non RMC pixels are excluded from temporal filtering. For these pixels the filter process degenerates to 2-dimensional filtering only applied to reference frame $t_0$.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] D. Scharstein and R. Szelisky, "A taxonomy and evaluation of dense two-frame stereo correspondence algorithms", IJCV, vol. 47, no. 1-3, pp. 7-42, 2002.
[2] M. Z. Brown, D. Burschka, and G. D. Hager. "Advances in computational stereo". IEEE Trans. Pattern Analysis and Machine Intelligence, 25(8):993-1008, 2003
[3] S. M. Seitz M. Z. B. Curless, J. Diebel, D. Scharstein, and R. Szeliski. "A comparison and evaluation of multi-view stereo reconstruction algorithms". In Proc. IEEE Conf. Comp. Vision and Pattern Recognition, pages 519-528, 2006
[4] C. Tomasi and R. Manduchi. "Bilateral Filtering for Gray and Color Images". In Proceedings of the IEEE International Conference on Computer Vision, 1998.
[5] Hosni, M. Bleyer, M. Gelautz, and C. Rhemann. "Local stereo matching using geodesic sup-port weights". ICIP 2009
[6] M. Mueller, F Zilly, and P. Kauff, "Adaptive cross-trilateral depth map filtering," in 3DTV-Conference: The True Vision-Capture, Transmission and Display of 3D Video (3DTVCON' 10), jun. 2010, pp. 1-4.

The invention claimed is:

1. A filter structure for filtering a disparity map, the filter structure comprising:
a first filter circuit that filters a contemplated section of the disparity map according to a first measure of central tendency;
a second filter circuit that filters the contemplated section of the disparity map according to a second measure of central tendency; and
a filter selector circuit that selects the first filter circuit or the second filter circuit to filter the contemplated section of the disparity map, the selection being based on at least one local property of the contemplated section; wherein
the disparity map is part of a temporal sequence of disparity maps and wherein the first filter circuit and the second filter circuit filter the contemplated section by evaluating a filter window associated with the contemplated section of the disparity map, the filter window being a 3-dimensional spatio-temporal window spatially and temporally extending beyond the contemplated section; and
the filter structure further comprises a motion compensation circuit that generates the temporal sequence of disparity maps by motion compensation so that collocated sections of different disparity maps within the 3-dimensional spatio-temporal window belong to one scene portion.

2. The filter structure according to claim 1, wherein the first filter circuit is a median filter and the first measure of central tendency is a median.

3. The filter structure according to claim 1, wherein the second filter circuit is an average filter and the second measure of central tendency is an average.

4. The filter structure according to claim 1,
wherein the first filter circuit is a median filter and the first measure of central tendency is a median, and
wherein the second filter circuit is an average filter and the second measure of central tendency is an average.

5. The filter structure according to claim 4, wherein the at least one local property controls a binary mask for the disparity map indicating to the filter selector circuit whether the first filter circuit or the second filter circuit is to be used to filter the contemplated section.

6. The filter structure according to claim 1, wherein the at least one local property comprises at least one of:
the contemplated section being labeled as reliably motion compensated by a motion compensation circuit upstream of the filter structure;
a detection of a depth discontinuity within a filter window that is used to filter the contemplated section;
a color inhomogeneity or gray value inhomogeneity within a filter window of a color image or a gray value image corresponding to the filter window of the disparity map that is used to filter the contemplated section; and
a variance of color samples exceeding a threshold, the variance being determined within a filter window of a color image or a gray value image corresponding to the filter window of the disparity map.

7. The filter structure according to claim 1, wherein at least one of the first filter circuit and the second filter circuit is a weighted filter.

8. The filter structure according to claim 7, wherein the disparity map is part of a temporal sequence of disparity maps and wherein a weighting performed by the weighted filter or the weighted filters is based on at least one of
a distance measure between the contemplated section and a further section of the disparity map to be used for the weighted filtering;
a confidence value for the contemplated section of the disparity map; and
a temporal consistency between the contemplated section of the disparity map and at least one of a preceding disparity map, several preceding disparity maps, a subsequent disparity map, and several subsequent disparity maps.

9. The filter structure according to claim 8, wherein the distance measure is determined on the basis of a sum of color differences along a path from the contemplated section to the further section.

10. The filter structure according to claim 1, wherein a filter window is associated to the contemplated section of the disparity map, the filter window being a 3-dimensional spatio-temporal window and defining a spatial extension and a temporal extension of filtering actions performed by the first filter circuit and the second filter circuit.

11. The filter structure according to claim 1, further comprising a section iterator that iterates the contemplated section of the disparity map over the disparity map or a part thereof.

12. The filter structure according to claim 1, wherein the contemplated section corresponds to a pixel of the disparity map.

13. The filter structure according to claim 1, wherein the filter selector circuit comprises an adaptive switching circuit that switches between the first filter circuit and the second filter circuit.

14. A method for filtering a disparity map, the method comprising:
   determining a local property of a contemplated section of the disparity map for filtering;
   selecting a first filter circuit or a second filter circuit for filtering the contemplated section, the selection being based on the at least one determined local property of the contemplated section;
   filtering the contemplated section of the disparity map using the first filter circuit or the second filter circuit depending on a result of selecting the first filter circuit or the second filter circuit; wherein
   the disparity map is part of a temporal sequence of disparity maps and wherein the first filter circuit and the second filter circuit filter the contemplated section by evaluating a filter window associated with the contemplated section of the disparity map, the filter window being a 3-dimensional spatio-temporal window spatially and temporally extending beyond the contemplated section; and
   the method further comprises generating the temporal sequence of disparity maps by motion compensation so that collocated sections of different disparity maps within the 3-dimensional spatio-temporal window belong to one scene portion.

15. The method according to claim 14, wherein the first filter circuit is a median filter and the first measure of central tendency is a median.

16. The method according to claim 14, wherein the second filter circuit is an average filter and the second measure of central tendency is an average.

17. The method according to claim 14,
   wherein the first filter circuit is a median filter and the first measure of central tendency is a median, and
   wherein the second filter circuit is an average filter and the second measure of central tendency is an average.

18. The method according to claim 14, further comprising:
   determining a binary mask for the disparity map on the basis of the local property, the binary mask indicating to the filter selector circuit whether the first filter circuit or the second filter circuit is to be used for filtering the contemplated section.

19. The method according to claim 14, wherein the at least one local property comprises at least one of
   the contemplated section being labeled as reliably motion compensated by a motion compensation circuit upstream of the filter structure;
   a detection of a depth discontinuity within a filter window that is used for filtering the contemplated section;
   a color inhomogeneity or gray value inhomogeneity within a filter window of a color image or a gray value image corresponding to the filter window of the disparity map that is used for filtering the contemplated section; and
   a variance of color samples exceeding a threshold, the variance being determined within a filter window of a color image or a gray value image corresponding to the filter window of the disparity map.

20. The method according to claim 14, wherein filtering the contemplated section comprises weighting disparity values comprised in the contemplated section of the disparity map.

21. The method according to claim 14, wherein the disparity map is part of a temporal sequence of disparity maps, and wherein the weighting is based on at least one of a distance measure between the contemplated section and a further section of the disparity map to be used for the weighted filtering;
   a confidence value for the contemplated section of the disparity map; and
   a temporal consistency between the contemplated section of the disparity map and at least one of a preceding disparity map, several preceding disparity maps, a subsequent disparity map, and several subsequent disparity maps.

22. The method according to claim 21, wherein the distance measure is determined on the basis of a sum of color differences along a path from the contemplated section to the further section.

23. The method according to claim 14, wherein a filter window is associated to the contemplated section of the disparity map, the filter window being a 3-dimensional spatio-temporal window and defining a spatial extension and a temporal extension of filtering actions performed by the first filter circuit and the second filter circuit.

24. The method according to claim 14, further comprising:
   iterating the contemplated section of the disparity map over the disparity map or a part thereof.

25. The method according to claim 14, wherein the contemplated section corresponds to a pixel of the disparity map.

26. The method according to claim 14, wherein the step of selecting the first filter circuit or the second filter circuit comprises a scene-adaptive switching between the first filter circuit and the second filter circuit in dependence on a local structure of color images and depth maps corresponding to the disparity map.

27. A non-transitory computer readable digital storage medium having stored thereon a computer program comprising a program code for performing, when running on a computer, a method for filtering a disparity map, the method comprising:
   determining a local property of a contemplated section of the disparity map for filtering;
   selecting a first filter or a second filter to filter the contemplated section, the selection being based on the at least one determined local property of the contemplated section;
   filtering the contemplated section of the disparity map using the first filter or the second filter depending on a result of selecting the first filter or the second filter; wherein
   the disparity map is part of a temporal sequence of disparity maps and wherein the first filter and the second filter perform filtering of the contemplated section by evaluating a filter window associated with the contemplated section of the disparity map, the filter window being a 3-dimensional spatio-temporal window spatially and temporally extending beyond the contemplated section; and
   the method further comprises generating the temporal sequence of disparity maps by motion compensation so that collocated sections of different disparity maps within the 3-dimensional spatio-temporal window belong to one scene portion.

28. The filter structure according to claim 1, wherein the at least one local property controls a binary mask for the disparity map indicating to the filter selector circuit where in the disparity map the first filter circuit and the second filter circuit are to be used to filter the contemplated section.

29. The filter structure according to claim 1, wherein the at least one local property comprises the contemplated section being labeled as reliably motion compensated by a motion compensation circuit upstream of the filter structure.

30. The filter structure according to claim 1, wherein the filter structure labels, as the at least one local property, the contemplated section as reliably motion compensated by evaluating a motion compensated temporal sequence of frames which corresponds to the temporal sequence of disparity maps and determining whether a change in a color intensity at sections of the motion compensated temporal sequence of frames which are collocated to the contemplated section exceeds a predetermined significance threshold.

31. The filter structure according to claim 1, wherein:
the first filter circuit is a median filter and the first measure of central tendency is a median, the first filter determines the median with the 3-dimensional spatio-temporal window; and
the second filter circuit is an average filter and the second measure of central tendency is an average, the second filter determines the average with the 3-dimensional spatio-temporal window.

32. A filter structure for filtering a disparity map, the filter structure comprising:
a first filter circuit that filters a contemplated section of the disparity map according to a first measure of central tendency;
a second filter circuit that filters the contemplated section of the disparity map according to a second measure of central tendency;
a filter selector circuit that selects the first filter circuit or the second filter circuit to filter the contemplated section of the disparity map, the selection being based on at least one local property of the contemplated section; and
a section iterator circuit that iterates the contemplated section of the disparity map over the disparity map or a portion thereof so that the contemplated section moves across the disparity map from a first location to a second location; wherein
the filter selector circuit selects the first filter circuit or the second filter circuit to filter the contemplated section of the disparity map at the first location depending on a value that the at least one local property of the contemplated section assumes at the first location and selects the first filter circuit or the second filter circuit to filter the contemplated section of the disparity map at the second location depending on a value that the at least one local property of the contemplated section assumes at the second location.

33. A method for filtering a disparity map, the method comprising:
determining a local property of a contemplated section of the disparity map for filtering;
selecting a first filter circuit or a second filter circuit to filter the contemplated section, the selection being based on the at least one determined local property of the contemplated section;
filtering the contemplated section of the disparity map using the first filter circuit or the second filter circuit depending on a result of selecting the first filter circuit or the second filter circuit; and
iterating the contemplated section of the disparity map over the disparity map or a portion thereof so that the contemplated section moves across the disparity map from a first location to a second location; wherein
the first filter circuit or the second filter circuit is selected to filter the contemplated section of the disparity map at the first location depending on a value that the at least one local property of the contemplated section assumes at the first location and the first filter circuit or the second filter circuit is selected to filter the contemplated section of the disparity map at the second location depending on a value that the at least one local property of the contemplated section assumes at the second location.

34. A non-transitory computer readable digital storage medium having stored thereon a computer program comprising a program code for performing, when running on a computer, a method for filtering a disparity map, the method comprising:
determining a local property of a contemplated section of the disparity map for filtering;
selecting a first filter or a second filter to filter the contemplated section, the selection being based on the at least one determined local property of the contemplated section;
filtering the contemplated section of the disparity map using the first filter or the second filter depending on a result of selecting the first filter or the second filter; and
iterating the contemplated section of the disparity map over the disparity map or a portion thereof so that the contemplated section moves across the disparity map from a first location to a second location; wherein
the first filter or the second filter is selected to filter the contemplated section of the disparity map at the first location depending on a value that the at least one local property of the contemplated section assumes at the first location and the first filter or the second filter is selected to filter the contemplated section of the disparity map at the second location depending on a value that the at least one local property of the contemplated section assumes at the second location.

\* \* \* \* \*